United States Patent [19]

Borchert et al.

[11] 3,909,474

[45] Sept. 30, 1975

[54] ROAD SURFACE STABILIZATION

[75] Inventors: Alfred E. Borchert, Cherry Hill, N.J.; Albert C. Condo, Newtown Square; Felix C. Gzemski, Glen Mills; John F. McGrogan, Philadelphia, Pa.; Benjamin C. Wilbur, Williamstown, N.J.

[73] Assignee: Atlantic Richfield Company, Los Angeles, Calif.

[22] Filed: Jan. 24, 1974

[21] Appl. No.: 436,246

Related U.S. Application Data

[63] Continuation of Ser. No. 184,304, Sept. 27, 1971, abandoned.

[52] U.S. Cl. ............ 260/28; 117/168; 260/28.5 AS; 260/29.2 TN; 404/17; 404/19; 404/32
[51] Int. Cl.² ........................................ C08L 95/00
[58] Field of Search ....... 260/28, 28.5 AS, 29.2 TN; 184/304; 117/168; 404/17, 19, 32

[56] References Cited
UNITED STATES PATENTS

| | | | |
|---|---|---|---|
| 3,387,982 | 6/1968 | Rogers et al. | 260/28 |
| 3,497,371 | 2/1970 | Chang | 260/28.5 AS |
| 3,637,558 | 1/1972 | Verdol et al. | 260/28 |
| 3,645,945 | 2/1972 | Lesesne et al. | 260/28 |

*Primary Examiner*—Melvyn T. Marquis
*Attorney, Agent, or Firm*—Coleman R. Reap

[57] ABSTRACT

Method of road surface stabilization particularly suitable for roads in the Arctic and sub-Arctic regions by admixing the surface aggregate of the road with an aqueous bituminous emulsion wherein the dispersed phase is a bituminous composition containing an elastomeric polymer produced in situ and chemically bound to the bituminous composition thereby providing excellent low temperature properties to the road surface stabilizing composition.

16 Claims, No Drawings

ROAD SURFACE STABILIZATION

This is a continuation, of application Ser. No. 184,304 filed Sept. 27, 1971, and now abandoned.

BACKGROUND OF THE INVENTION

1. Field of the Invention

This invention relates to a method of stabilizing road surface aggregates, to compositions for such stabilization, to methods for the production of such compositions, and to roads stabilized therewith, in particular, road surface stabilizing methods employing aqueous bituminous emulsions wherein the dispersed phase of the emulsion is a bituminous composition containing an elastomeric polymer which is produced in situ and chemically bound to the bituminous composition. The emulsion is admixed with the road surface aggregate in order to consolidate the coarse and fine aggregate particles and, thus, stabilize the road surface over a wide range of ambient temperatures, including the extremely low temperatures encountered in the Arctic zone.

2. Prior Art

The use of bituminous materials such as asphalts, tars pitches and the like in the molten condition, in solvents or in aqueous emulsions for admixing with a wide variety of aggregates to produce roads and for surfacing roadways having various types of underlying bases is, of course, a very old art.

Under ordinary winter-summer temperature ranges found in the temperate or tropical zones, a wide latitude of materials and construction methods can be employed since the primary considerations are the amount and type of traffic expected and the local availability of the materials of construction.

One method of constructing such roads involves excavating the roadway to a point where a hard stable soil base is reached, then filling the excavation to a desired depth with coarse rock which in turn is covered with a gravel layer. The gravel layer is covered with a mixture of bitumen aand "graded " aggregate, i.e. an aggregate wherein the ratio of various sized aggregate particles is controlled such that the void spaces between the particles are minimized. The void spaces remaining are filled with the bitumen thus providing a strong, solid roadway. Frequently, such a roadway is provided with a finishing layer of asphalt mixed with extremely fine aggregate for a smooth surface. Since the temperature ranges in the temperate and tropical zones are generally in the direction of elevated temperatures rather than extremely low temperatures, the bituminous material employed does not require extremely high quality low temperature properties, i.e. ductility and adhesion at low temperatures, but rather it requires good high temperature properties, i.e. strength and adhesion at elevated temperatures. Such bituminous materials are generally relatively high softening point materials and are generally applied, initially at least, in the molten condition, although in patching and repair, emulsion type materials are frequently employed.

An entirely different situation arises however in Arctic roadway construction. In such construction the gravel roadway base is generally the permafrost, i.e. the perpetually frozen ground which underlies the so-called active layer or tundra which is the active growth and vegetation layer. The permafrost may lie from a few inches to several feet below the surface but in order to maintain its frozen condition the roadway must be sufficiently thick to provide the necessary insulation to prevent the permafrost from melting in the spring and summer when temperatures above the freezing point of water are encountered.

The gravel used for constructing roads in the Arctic is not available locally and hence has to be transported from considerable distances. No attempt is made therefore to provide a graded aggregate and, accordingly, there is a random mixture, large pieces admixed with exceedingly fine material in the form of dust. This fine material or "fines" is objectable since this material washes badly in the spring thaws and when dry the dust flies about when the road is traveled, such that travel becomes hazardous and the efficiency of truck transport is greatly decreased, since frequently, an extra 15 to 25 percent trip time is required. In view of the fact that bituminous materials absorb heat readily, i.e. they are a "black body" type material, it was thought that to use such a material for consolidating the surface aggregate of a road would be impractical since the bituminous layer would promote heat transfer and thus thawing of the permafrost base. Accordingly, it was conceived that an aqueous agglomerating or thixotropic type of material might be useful in consolidating the roadway surface. Moreover, a material meeting these specifications was readily available in the form of drilling muds, which became available and required disposal upon completion of each well.

Accordingly, drilling muds were used to wet down the roadway and while they remained damp they alleviated the problem of flying dust, rocks and gravel. It was found, however, that when the muds dried they in turn contributed to the problem since they produced an extremely fine dust. This dust was thrown about in all directions under traffic, and frequently was deposited on to the adjacent vegetation of the tundra and ice surfaces potentially damaging the tundra or contributing the melting and subsistence of the ice surfaces over a period of time, thus creating additional problems. It became clear therefore, that it was necessary to treat the upper surface of the roadways in a manner to consolidate the fines and, to at least some extent, the coarse aggregate such that the roadway did not wash with runoff water, erode with traffic and throw up dust creating a traffic hazard and which might potentially damage the adjacent tundra and ice surfaces.

It was recognized however, that the consolidating material could not be of the same nature as employed in ordinary road building procedures, since, as has been pointed out, this would destroy the thermal insulation properties of the road. Moreover, the consolidation material should also be of a nature such that it is readily applied to the roadway surface even when the aggregate is wet and cold as is frequently the situation in the Arctic. Finally it should not become soft and adhere to tires at ambient summer temperatures of become hard aand brittle at the low temperatures of the winter which frequently reach −50°F. or below.

It was known that in temperature climates attempts had been made to provide low temperature flexibility and ductility to asphalt compositions by incorporating therein natural rubber, rubber latex, styrene-butadiene polymers and similar polymeric materials, generally by simply mechanically admixing the polymer with the bituminous material. In order to obtain relatively homogeneous compositions polymers were added to molten asphalt or to other bituminous materials with milling procedures and the like to give the final product. Although it had been indicated, where tried, that these asphalt-polymer mechanical mixtures had shown improved low temperature properties in temperate climates, as had been pointed out, they were employed in a different method of road building wherein the aggregates were graded, at least to some extent, and thus all of the void spaces were substantially filled with the composition.

In order to obviate the disadvantages of these prior art bitumen-polymer mixtures it has been proposed to incorporate polyurethane prepolymers in bituminous compositions. For example, in U.S. Pat. No. 3,372,083 (1968) to Evans et al. a composition is proposed for floor tile, or caulking for glass and concrete which is made from the reaction of an isocyanate terminated prepolymer and the isocyanate adduct of an unmodified tar. It is pointed out in this patent that a bituminous material preferably one which has not been blown, i.e. oxidized, is reacted with an isocyanate preferably a polyisocyanate. It is preferred that the bituminous substance contain water up to about 1 percent by weight for reaction with the isocyanate. The resulting adduct is then admixed with a polyurethane prepolymer which cures in the presence of moisture to form an elastomer. This material when used is allowed to cure by exposure to the moisture of the air at the point of use. In general, the prepolymer ranges from 1 part by weight to from 0.2 to 6.7 parts by weight of the isocyanate adduct.

Another patent, U.S. Pat. No. 3,179,610, (1965) to Wood discloses a joint sealer and paving composition containing liquid polyurethane and a bituminous material. In this patent a liquid polyurethane prepolymer produced utilizing a molar excess of polyisocyanate is added to a liquid bituminous material and the polyurethane prepolymer is cured in situ by reaction with the water, etc., in the bituminous material.

Although these latter patents indicate improvement over prior art methods wherein rubber latex and similar polymers were mechanically admixed with bituminous materials it will be noted that they still require the admixture of a prepolymer with a bituminous component and moreover, both employ a large excess of isocyanate.

In a third patent, U.S. Pat. No. 3,540,906, there is disclosed an airblown asphalt composition of high viscosity to penetration ratio containing a minor amount of a hydroxyl terminated polydiene oil produced by adding the oil to the asphalt and therefore airblowing. The presence of the polybutadiene in the asphalt is said to give an increased rate of oxidation and to result in a hard composition having a higher viscosity to penetration ratio than is obtained when the asphalt is blown to the same hardness without the oil. This asphalt is used in paving wherein complete filling of the void spaces between the aggregate particles is the objective.

In U.S. Application, Ser. No. 630,512, filed Apr. 3, 1967, to Fauber, now U.S. Pat. No. 3,650,791 there is disclosed a paving asphalt produced by first reacting a diisocyanate with the asphalt and thereafter if desired incorporating a polyol preferably a hydroxyl terminated polymer and additional isocyanate to produce a urethane. This material also contains an excess of diisocyanates.

A second U.S. Application, Ser. No. 149,354, filed June 2, 1971, to Statton, and now abandoned, discloses a coating composition comprised of a bituminous material, polyisocyanate, polyepoxide and a polyol. This composition is prepared by dissolving a coal tar pitch, for example, in a solvent such as toluene and thereafter adding the other components and applying the resulting composition to surfaces such as steel or aluminum surfaces. This composition is not suitable for use in accordance with the objectives of the instant invention since it contains components not suitable for producing the emulsion compositions of the instant invention and is designed to be produced in the presence of a solvent for the bituminous matter which has been pointed out is not suitable in the instant invention as an aggregate stabilizing composition.

U.S. Application, Ser. No. 797,347, filed Jan. 23, 1969, to Verdol et al., now U.S. Pat. No. 3,637,558 discloses a paving composition containing a urethane polymer, wherein the polymer is not completely cured prior to being admixed with the asphalt, but which polymer is curable at paving temperatures. This composition is stated to have good low temperature characteristics and is suitable for use in paving in accordance with well-known methods, i.e. wherein the void spaces are completely filled.

The instant composition and method differs in that the polyol which is compatible with the bituminous composition and is soluble therein is first admixed with the bituminous composition which composition also contains functional groups, such as hydroxyl groups. An isocyanate preferably a polyisocyanate together with a catalyst is added to the bituminous-polyol mixture and reacted therewith. This produces a polyurethane having elastomeric properties which polymer not only is produced to give an homogeneous mixture but is also chemically combined with the bituminous component by the crosslinking action of the isocyanate with the hydroxyl groups of the polyol and of the bituminous composition. The resulting composition therefore has excellent low temperature viscosity, flexibility and ductility properties since the elastomeric polymer is produced in situ and thus forms a homogeneous composition and in addition the polymer is actually chemically combined with the bituminous component.

Moreover, as will be discussed in greater detail, the amount of isocyanate employed is less than that required by the stoichiometry of the system, that is the ratio of the hydroxyl groups which can react with the isocyanate groups is much greater than the number of isocyanate groups. The prior art bituminous compositions discussed produce, in general, hard or gel-like products but in addition the instant compositions are readily emulsifiable and must be employed in that form. The compositions of the instant invention by their method of production are readily emulsified, are not gel-like and can be applied to provide a thin, flexible and consolidating coating to aggregates under Arctic and sub-Arctic conditions.

The present invention also provides a distinct advantage over prior art road stabilization methods and compositions because of the rather unique situation found in the Arctic and sub-Arctic regions. Because these regions are remote and, accordingly, the cost of transporting fuels is extremely great, the crude oil produced is topped to remove a light boiling fraction, for example a 10 percent overhead useful as fuel, and the next 20 percent overhead as a fraction valuable as a diesel fuel for the operation of heavy machinery, power generation and the like. The residual 70 percent fraction, therefore requires an economical and convenient method for disposal. Moreover as has been pointed out, as each well is completed, the drilling mud employed during the drilling operation is no longer required, and it too, presents a disposal problem. In accordance with this invention these two materials which seemingly present disposal problems can in fact be combined in such a manner as to provide a useful combination. The drilling muds can be added to the gravel roadway to provide additional aggregate and thereafter the residuals when processed in the manner to be described can be utilized to consolidate the drilling mud fines with the other aggregate employed in building the roadway to provide a consolidated surface which can be utilized by heavy truck traffic and the like.

SUMMARY OF THE INVENTION

The present invention provides a method for the consolidation of extremely fine particles, including the fines naturally found in gravel, as well as fines which may be added in the form of drilling muds, together with the coarser aggregate particles without completely filling the void spaces between the particles and thereby avoiding a high heat transfer or heat absorbing surface. The present invention also differs from the known prior art in that excellent low temperature properties are imparted to the bituminous material which is available locally in the Arctic and which bituminous material is provided with reactive groups such that when the elastomeric polymer is formed in situ, there is a chemical combination between the polymer and the bituminous material.

The present invention also provides a composition which is readily applied to the roadway surface and which has a sufficiently high softening point such that it does not soften and adhere to vehicle tires at summer time temperatures nor is it cracked or spalled from the aggregate at the extremely low wintertime temperatures.

The objects of this invention therefore are:

to provide a method for the consolidation of the surface aggregate of roadways located in the Arctic or sub-Arctic regions;

to provide a method for the consolidation of fines together with coarser aggregate particles of roadway surfaces located in the Arctic or sub-Arctic regions without completely filling the void spaces between the aggregate particles by the consolidation material;

to provide a method for the consolidation of aggregate particles on roadway surfaces located in the Arctic and sub-Arctic regions which avoids forming a high heat transfer or heat absorbing surface;

to provide a method of utilizing bituminous compositions available locally from oil fields in remote locations such as the Arctic zone for the consolidation of aggregates on roadway surfaces;

to provide a composition which can be readily applied to the surface of roadways located in the Arctic or sub-Arctic regions and which consolidates the surface aggregate particles;

to provide a bituminous composition for the consolidation of surface aggregate particles which does not soften and adhere to vehicle tires at relatively high ambient temperatures and which also does not crack or separate from the aggregate at extremely low ambient temperatures such as encountered in Arctic regions;

to provide a bituminous composition for the consolidation of extremely fine material such as drilling mud particles which has been deposited on roadway surfaces located in the Artic or sub-Arctic regions;

to provide a bituminous composition for the consolidation of aggregates on roadway surfaces located at the Arctic or sub-Arctic regions which permits the roadway surface to be reworked readily, to repair the effects of heavy vehicular traffic;

to provide a bituminous composition for the consolidation of aggregate particles on roadway surfaces located in the Arctic or sub-Arctic regions which prevents dispersion of such particles to the surface of the tundra or ice fields adjacent the roadway;

to provide a bituminous composition for the consolidation of aggregates on roadway surfaces located in the Arctic or sub-Arctic regions wherein said bituminous composition contains an elastomeric polymer formed in situ and chemically combined therewith and which can be emulsified readily with water;

to provide a method for the production of an aqueous bituminous emulsion for the consolidation of aggregates on roadway surfaces located in the Arctic or sub-Arctic regions wherein a polymer is formed in situ in the bituminous component and is chemically combined with the bituminous component;

to provide a bituminous composition having a bituminous component obtained from an Arctic or sub-Arctic crude oil residuum wherein hydroxyl groups have been introduced in order to chemically combine with the bituminous component elastomeric polymers formed therein;

to provide a road located in the Arctic or sub-Arctic regions having its surface aggregate particles stabilized by the method and composition of this invention.

Other objects of this invention will be apparent from the following detailed description of the invention and of the preferred embodiments thereof as well as from the claims.

DESCRIPTION OF THE INVENTION AND OF THE PREFERRED EMBODIMENTS

In accordance with the instant invention a bituminous component is produced in such a manner that it contains hydroxyl groups, e.g. those formed by air oxidation of the bituminous material at elevated temperatures. This bituminous component is admixed with suitable polymer-forming components and an elastomeric polymer is formed in the bituminous component whereby such polymer is chemically combined with the bitumen. The resulting bituminous composition is emulsified with water and applied to the aggregate particles forming the roadway surface. Preferably the aqueous emulsified bituminous composition is applied by spraying such particles while they are being moved about in such a manner as to continually expose fresh surfaces for coating.

The bituminous component constitutes, in general, the major portion of the composition applied to the roadway. This component is an important and novel feature of this invention.

Since it is an important feature of this invention that the compositions and methods employed be suitable for the Arctic and sub-Arctic regions the invention will best be described with reference to methods suitable for use in components obtainable in the North Slope Alaskan oil fields, such as the Prudhoe Bay area. It has been found that when the crude oil from this Alaskan crude source is suitably topped, i.e. an overhead fraction removed therefrom, that the bottoms fraction or residuum is an excellent source of bituminous material for the bituminous component of this invention.

In order to obtain this bituminous component this Alaskan crude oil is fractionated to remove about 10 volume percent initially and then an additional 20 volume percent for use as diesel fuel leaving about a 70 volume percent bottoms fraction, frequently referred to as the bottoms fraction or residuals. Although the boiling range will, of course, vary somewhat, in general the residual fraction has an initial boiling point of above about 234°F. at 1 atmosphere with a 50 percent point of about 546°F. at 10 millimeters Hg pressure at which point some cracking starts. In general it can be described as the residuum after removal of overhead material boiling high enough to include the diesel fuel boiling range in accordance with conventional refinery practice. This material is a mixture of straight chain paraffins, iso-paraffins, monocyclic paraffins, polycyclic paraffins, and aromatics having from 1 to 5 rings including uncondensed and condensed ring compounds as well as alkylated ring compounds. This is a typical resid analysis for a "long" residuum boiling above the diesel fuel range.

Since this residuum is utilized as the sole source of the bituminous component it is necessary that it be air oxidized in order to produce a component having the desired viscosity characteristics air oxidation is carried out at temperatures of about 400°F. for 5 to 6 hours, although temperatures in the range of from 300°F. to 550°F. can be used by adjusting the time of the oxidation correspondingly, i.e. 8 to 3 hours. In addition the rate is affected by the rate of air or other oxygen containing gas introduced into the molten components and also the degree of dispersion of the air or amount of agitation of the mixture.

In addition to providing the desired viscosity, softening point and penetration characteristics to the bituminous component the air oxidation also introduces hydroxyl groups into the hydrocarbon molecules of the resid together with additional amounts of other oxygen containing groups.

Although the invention has been described using a 70 percent residual fraction it will be understood that a "shorter" residuum fraction can also be used as the bitumen source. Thus, for example, if it were found that the crude could be topped to give useful fuel fractions down to a 30 or 40 percent bottoms, this fraction also could be used, although it might require a lesser amount of oxidation to give the desired softening point, penetration and viscosity characteristics and to provide hydroxyl groups, which oxidized fraction then could be combined with the polymer to provide the bituminous portion of the instant composition.

In order to accomplish the desired objects of this invention to elastomeric polymer is produced in situ in the bituminous composition. The polyol is dissolved first in the oxidized bituminous component which has been heated to an elevated temperature, for example 140°F. to 160°F., although this range is not critical except that it should be high enough such that the mixture is sufficiently fluid for good mixing but which is not high enough to cause polymerization of the polyol. The polyol-bituminous component is agitated at elevated temperature for a time ranging from ½ to 4 hours, although generally a mixing time of about 2 hours is sufficient.

A catalyst in catalytic amounts suitable for the production of the polyol-isocyanate polymers, i.e. urethane polymers, is added and blended with the polyol-bituminous component mixture. Since there are frequently ingredients in the bituminous component which might degrade the activity of the catalyst, it is preferred that the isocyanate be added immediately to the polyol-bituminous component-catalyst mixture. Preferably, this mixing should be carried out at temperature in the range of 250°F. to 300°F. for from ½ to 4 hours and preferably from 1½ to 3 hours to insure complete reaction. If the mixing is carried out at lower temperatures it may be necessary to allow the mixture to stand at such temperatures for several hours in order to cure, i.e. react, to the desired degree. Alternatively, but less preferable, the isocyanate can be added to the bituminous component-polyol blend and the catalyst added thereafter. In such cases, however, it may be necessary to admix the catalyst with a portion of the bituminous component priot to addition in order to get uniform dispersion. Accordingly, this method is somewhat less preferred but can be used with equal success as the first described method.

In general, from 3 to 20 parts by weight of the urethane polymer is incorporated in 100 parts by weight of the bituminous component. It has been found that amounts in excess of about 10 parts by weight and particularly in excess of 20 parts by weight of the polymer per 100 parts by weight of the bituminous component produce a gel-like structure which is difficult to handle and emulsify and which does not improve the low temperature properties of the composition sufficiently to warrant the increased difficulty of handling and cost.

As will be described hereinafter, the bituminous component in which the elastomeric polymer has been produced, is emulsified with water to produce the aqueous emulsion which is utilized as the consolidating material. In commercial practice therefore, this provides a method of terminating the polymerization reaction in the bituminous component since as soon as the bituminous component containing the polyol-isocyanate mixture comes into contact with water the reaction is "killed" by the water and no further polymerization occurs. Since the viscosity of the bituminous component is, to some extent at least, a function of the molecular weight of the polymer as well as the amount of polymer contained therein, it will be apparent that the emulsification procedure provides a method of insuring that the reaction does not continue thereby increasing the viscosity beyond that desired.

Although any polyol having a substantially hydrocarbon backbone structure and which is soluble in the bituminous component can be employed, a preferred composition is the material sold under the tradename "Poly Bd". The preferred Poly Bd resins are hydroxyl-terminated polymers based principally on butadiene. The hydroxyl groups are primary and allylic and can be reacted with isocyanates to produce polyurethane elastomers. The preparation and properties of these resins are described in U.S. Pat. Nos. 3,427,366 and 3,333,015.

These polyols can be characterized further as being unsturated polyhydroxy polymers with number average molecular weights of about 500 to 20,000 having chain olefinic content of about 50 – 65 percent trans, 15 – 25 percent cis and 15 – 25 percent pendant vinyl along with 2 to 3 hydroxyl groups per molecule, i.e. a polymer based on butadiene. In general, these are also described in detail in the aforementioned Application, Ser. No. 797,347 to Verdol et al., however, such description therein also includes copolymer compositions including styrene and acrylonitrile. Copolymers are not preferred in the instant composition, instead only homopolymers based on butadiene are employed.

Although several types of Poly Bd liquid resins are produced commercially, the preferred type for use in this invention bears the designation, "Poly Bd R-45HT". This type is a homopolymer, i.e. it is based entirely on butadiene-1,3. Typically it has a viscosity (poise at 30°C.) of about 50, a hydroxyl content in millequivalents per gram of about 0.80, a moisture content of about 0.05 weight percent, in iodine number of about 3.98 and a number average molecular weight of about 3000. Thus, in general, this resin has an average of from about 2.2 to 2.5 hydroxyl groups per mole. The polybutadiene microstructure is typically: 60 weight percent trans-1,4; 20 weight percent cis-1,4; and 20 weight percent pendant vinyl-1,2. Accordingly, this resin provides hydroxyl groups for reaction with the isocyanate which is added subsequently to produce the urethane polymer.

Any typical diisocyanate or polyisocyanate can be employed for producing the urethane elastomeric polymer. For example, toluene diisocyanate is particularly suitable, however, polymer diisocyanates such as those sold commercially, a preferred example being sold under the tradename of "Hylene TRF", are particularly suitable. The term polyisocynate as used herein has the same meaning as accepted in the art, i.e. there are only two isocyanate groups per mole, thus the weight ratio of isocyanate to total polyisocyanate weight is less than for the lower molecular weight compounds such as toluene diisocyanate. Aliphatic, aromatic and alicyclic polymeric isocyanates and their mixtures can be used in the instant invention. Illustrative but not limiting examples are: toluene 2,4-diisocyanate; mixtures of toluene 2,4-diisocyanate and toluene 2,6-diisocyanate; diphenylmethane 4,4'-diisocyanate; metaphenylene diisocyanate; hexamethylene diisocyanate; napththalene 1,5-diisocyanate; 3-isocyanatomethyl-3,5,5-trimethyl-cyclohexyl isocyanate; 2,2,4-trimethylhexamethylene 1,6-diisocyanate and hexamethylene diisocyanate.

It is necessary to employ a ratio of polyol to isocyanate such that there is an excess of hydroxyl groups over isocyanate groups rather then the usual prior art excess of isocyanate groups. It is preferred to employ at least a 10 percent excess of hydroxyl groups from the polyol over the isocyanate groups. In addition this excess can be as high as 5 times the number of hydroxyl groups compared with isocyanate groups, i.e. a ratio of from 1.1:1 to 5:1. It will be understood that in addition there is an indeterminate number of hydroxyl groups in the oxidized residuum which further increases the excess amount of hydroxyl groups over isocyanate groups. This excess is necessary to prevent excessive crosslinking which would give excessive gel formation and cause handling problems and emulsification problems. Since there are hydroxyl groups in the bituminous component which can react with the isocyanate, the resulting polymer will undergo the proper degree of isocyanate crosslinking between the hydroxyl groups of the polyol and the hydroxyl groups in the bituminous component. The resulting polymer is then chemically combined with the bituminous component.

Triisocanates, tetraisocyanates and higher are not useful since they cause too much crosslinking and thus the undesired gel-like structure. The diisocyanates give linear polymers with only sifficient crosslinking to bind the polymer to the bitumen as has been described.

In the preferred method for producing the elastomeric polymer in situ, the polyol, has been pointed out, is dissolved in the bituminous component and thereafter there is added a catalytic aamount of a catalyst which promotes the polyol-isocyanate reaction as well as the reaction between the function groups of the bitumen and the isocyanate. These catalysts which promote this reaction to produce the polyurethane elastomeric type resins are well known in the polyurethane art. Two catalysts which have been found to be suitable in dibutyltim dilaurate and stannous octoate, however, it will be understood that any of the well-known conventional catalysts which promote the polyurethane reaction can be employed. Examples of these are: 2,2-diazabicyclooctane; N,N,N',N' tetramethyl-1,3-butane diamine; triethylamine; N-ethyl morpholine; dibutyltin di-2-ethyl hexoate; stannous oleate and the like. Combinations of the tin salts and the amines also can be used effectively. It will be understood that the catalyst can be omitted entirely as in polyurethane reactions, but the reaction, i.e. curing time becomes so long that this is completely impractical.

The amounts of the catalyst can range from about 0.01 weight percent to 4.0 weight percent bases on the weight of the polyol with a preferred range being from 0.5 to 3 weight percent based on the polyol. It also will be understood, that it is preferred to use somewhat larger amounts of catalysts than the amounts normally employed in the polyurethane reaction since the polyol is incorporated into the bituminous component prior to reaction and consequently, the catalyst concentration will be somewhat diluted by the bitumen.

While under ordinary conditions it might be possible to incorporate the bituminous composition containing the polyurethane elastomer with the road aggregate particles by physically admixing the aggregate with the molten bituminous composition or by dissolving the bituminous composition in a suitable low molecular weight hydrocarbon solvent such as petroleum naphtha and admixing the aggregate with the bituminous solution, these methods are not suited to the purpose of this invention.

The use of the bituminous composition in the molten condition is impractical in the Arctic or sub-Arctic regions since in order to get adherence to the aggregate when ambient temperatures are 40°F. to 50°F. as frequently encountered even during the summer it is necessary to dry and heat the aggregate. Moreover, it is extremely difficult to merely provide sufficient bituminous composition to consolidate the particles but not fill the void spaces thus deleteriously affecting the insulation properties of the roadway.

In addition, the gravel composition below the embankment surfaces are often saturated with moisture and any amount of moisture up to the incipient wetness point of the particles would tend to repel the hydrocarbon base mixture and result in poor treating uniformity and adhesion.

The use of naphtha solutions of the bituminous composition, i.e. "cut-backs" is also undesirable since these present a dangerous fire hazard and are slow to "set" in cold ambient temperatures, and moreover these do not adhere to wet aggregate.

Thus an aqueous emulsion of the bituminous composition is necessary since it can be applied at temperatures well below the softening point of the bituminous composition, which conditions are encountered in the Arctic and sub-Arctic regions. Moreover the aqueous emulsion can be applied to moist, or even wet, aggregates with complete success and the amount can be readily controlled to give the desired penetration and degree of consolidation.

A very large number of commercially available compounds are suitable for emulsifying bituminous materials with water for application to gravel and similar types of aggregates. Many of these compounds not only produce emulsions which remain sufficiently stable for relatively long periods of time such that they can be transported from a central manufacturing point to the point of use, but such emulsifiers also have the property of causing the bituminous composition to adhere to the aggregate after application and prevent the bituminous composition from being stripped from the aggregate when subjected to contact with water from any source.

Bituminous emulsions are also less expensive and less hazardous to use than "cut-backs" since they are made with water and have good storage and transportation properties. Finally, their dosage can be controlled readily to consolidate the aggregate particles without filling the void spaces between the particles and thus harming the insulation properties of the roadway.

Two types of emulsifying agents are available for the emulsification of bituminous materials. These are the anionic type and the cationic type. The cationic type are preferred for the method of this invention for a number of reasons. It is generally simpler to produce an emulsion with a cationic emulsifier since fewer ingredients are required with the the cationic emulsifier. Soft water is generally needed to prepare anionic emulsions since water with high calcium or magnesium contents are not compatible with anionic emulsifiers. Cationic emulsifiers, however, are not sensitive to hard water and thus it is unnecessary to employ soft water in producing emulsions from them.

All cationic emulsifiers carry a positive charge. Many aggregates inherently bear a negative charge and, thus there is an affinity between the cationic emulsifier and aggregate. Aggregates which may be positively charged however, can be coated successfully using the cationic emulsifiers becuase of the highly absorbtive character of these cations. The bituminous material therefore, in cationic emulsions is strongly attracted to the aggregate particles and will displace the surface water and adhere to the aggregate particles so strongly that stripping of the bituminous component by water from any source is inhibited. Thus, it is unnecessary to utilize an anti-stripping agent. The cationic emulsions also have a number of other important properties. They can be applied during wet weather on wet aggregates at low temperatures, for example at 40°F. and by proper formulation their rate of "breaking", i.e. deposition of the bituminous component can be controlled.

A particularly preferred group of compounds of the cationic type of emulsifier is sold under the tradename of "Redicote". In general these can be described as fatty acid amines and a typical compound is a diamine having the formula:

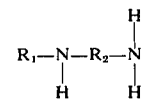

wherein $R_1$ is a long straight chain alkyl group and $R_2$ is generally a shorter straight chain alkylene group. When used they are employed in the form of their hydrochloride (produced by the additon of HCl) which ionizes in water solutions to give the ions:

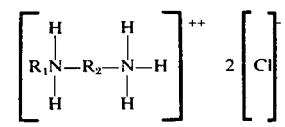

wherein $R_1$ and $R_2$ have, of course, the same designations. A typical example is:

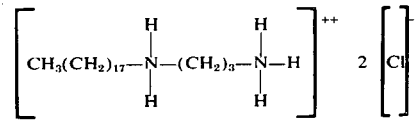

The length of $R_1$ and $R_2$ can be varied of course to provide the desired hydrocarbon solubility and adsorbtive properties. A particular grade, "Redicote E-23", has been found suitable for the method of this invention.

However, it will be understood that the particular type of emulsifier is not critical since a large number are available commercially and have been demonstrated to be completely successful for the emulsification of bituminous-water mixtures and which prevent the stripping of the bitumen from the aggregate after the emulsion has broken and deposited the bitumen on the aggregate. The amount of the emulsifier is generally suggested by the manufacturer or supplier thereof. In general, a concentration upper limit for the above-described Redicote E-23 is about 1.5 weight percent based on the weight of the water with from 1.0 to 1.3 weight percent preferred. In addition, in accordance with conventional practice calcium chloride can be added for storage stability together with hydrochloric acid to adjust the pH to from about 5 to 7, preferably 5 to 6.5 with a more preferred range being from about 5.3 to 5.8. In general, the amount of calcium chloride (anhydrous) based on total weight of the bituminous component and water will be about 0.1 weight percent, although this can vary somewhat and the calcium chloride can be omitted entirely. Similarly, the amount of hydrochloric acid employed is adjusted such that the desired pH is obtained. It will be understood, however, that other emulsifiers may require different additives in accordance with the suggested formulations of the manufacturer or supplier of the emulsifier.

The emulsion is produced by heating the bituminous composition to an elevated temperature, for example from 225° to 275°F., preferably about 250°F., and heating the water solution of the emulsifier, stabilizer and acid to from 155° to 170°F. The water and bituminous composition are then introduced into a conventional colloid mill, for example a Charlotte colloid mill or a Gaulin-Manton colloid mill, both of which are trade-named mills and are available commercially. If necessary the mixture of bituminous component and water may be recycled through the colloid mill one or more times in order to obtain the desired emulsification.

The ratio of bituminous composition to water can be varied over relatively wide ranges for example; the bituminous composition can range from 35 to 65 weight percent with the water solution ranging from 65 to 35 weight percent, with a preferable range being from 50 to 60 weight percent bituminous material and 50 to 40 weight percent water. In the emulsions thus produced the bituminous composition is in the dispersed phase.

Further in accordance with this invention the aqueous bituminous emulsion is admixed with the surface aggregate of the roadway located in the Arctic or sub-Arctic regions in order to consolidate the aggregate particles. Preferably the surface penetration into the road should range from at least 1 inch down to 6 to 8 inches. One method of accomplishing this is by raking the roadway surface aggregate utilizing, for example a road grader equipped with a scarifier (rake type equipment) in order to expose the aggregate particles to the desired depth and spraying them with the emulsion to give a uniform treat. Finally, after the raking and spraying operation has been completed the plow attachment to the grader is employed to distribute the treated gravel evenly across the road. Alternatively, tilling type equipment can be utilized, for example roto-mixers equipped with spraying attachments such that the aggregate can be tilled to the desired depth by the roto-mixer and sprayed with the emulsion to provide an even treat to the aggregate to the desired depth. After the roadway has been graded to distribute the treated aggregate evenly, compacting equipment is used to compress and consolidate the surface and render it suitable for use.

In general the gravel employed in the Arctic and sub-Arctic regions for roadway construction consists of at least 10 percent which will pass through a 1½ inch size sieve but will be retained on a 1 inch sieve. Less coarse particles are admixed with these large pieces of aggregate down to the extremely small particles, i.e. the fines, some of which will pass through a No. 200 mesh sieve. It has been found that the problem of consolidating such roadway surfaces in such regions requires the particular composition and method described herein in order to accomplish the objectives of this invention.

The dosage, i.e. the amount of emulsion of bituminous material per square yard is adjusted such that the particles are treated sufficiently to accomplish their consolidation and to the desired depth. An excess over this amount should be avoided, however, in order to prevent completely filling the void spaces between the aggregate particles with the bituminous material which has been pointed out deleteriously affects the insulating properties of the roadway.

In general, it has been found that dosages ranging from about 1.5 gallons to 3 gallons per square yard is sufficient to accomplish the objectives of this invention when the bituminous component ranges from 50 to 60 weight percent of the emulsion and the depth of the penetration into the roadway surface is from 6 to 8 inches.

The following examples are provided for the purpose of illustrating the invention in greater detail:

EXAMPLE I

A 70 volume percent residual of Alaskan crude as described hereinbefore, was oxidized. There was charged 1500 grams of the 70 percent residuals to a resin kettle having a reflux condenser, stirrer and fritted-disc air purger. The residuals were heated to 400° F. and an air flow of 1900 ml/minute was maintained through the liquid. The oxidation was continued for 5.5 hours after which 1475 grams of product was recovered while an overhead of 57 grams of oil and 31 grams of water was also recovered. The product had the consistency of a petroleum jelly at room temperature. Its Brookfield viscosity at 290°F. was 52 centipoise (cps), 68 cps at 270° F., 93 cps at 250° F. and 451 cps at 200° F. The product density was 0.962 grams/ml at 77°F.

This run demonstrated that Alaskan crude residuals can be oxidized readily with a minimum amount of weight loss in a relatively short time to produce a product having the viscosity characteristics desired for the purposes of this invention.

EXAMPLE II

A sample of the oxidized Alaskan 70 percent residuals from Example I amounting to 1356 grams was charged to the resin kettle and heated to 250° F. with stirring. To this was added 71.4 grams of a polyol consisting of Poly Bd R-45HT (0.83 milliequivalents of OH per gram) and the blend was agitated at 250° F. The Brookfield viscosity of this blend was 136 cps at 250° F. and 870 cps at 200° F. A 600 gram quantity of this blend was heated with stirring to 240° F. and 0.3 grams of dibutyltin dilaurate and 3 grams of a commercial polyisocyanate having 7.95 millieq. of isocyanate (—NCO) per gram were added and the blend agitated at 240° F. for 2 hours. The OH groups were about 10 percent in excess over the NCO groups. The product had a Brookfield viscosity of 1500 cps at 220° F., 2600 cps at 210° F. 5000 cps at 200° F. and 6000 cps at 195° F.

EXAMPLE III

An emulsifier solution was prepared by adding 50 grams of Redicote E-23 cationic emulsifier, described hereinbefore, 11.8 grams of $CaCl_2$ and 25 grams of 17 N HCl to 2370 grams of distilled water. The resulting solution had a pH of 5.7. The aqueous emulsifier solution amounting to 40 parts by weight was heated to 160° F. and 60 parts by weight of the oxidized residuals-elastomeric polymer component produced in Example II at a temperature of 260° F. was added. The combined blend was milled 3 times in a Gaulin colloid mill at a temperature of 190° F. and at a setting of 3 mils. The product emulsion had a Brookfield viscosity of 47 cps at 160° F. 55 cps at 130° F. and cps at 110° F. and contained 59 percent solids. The emulsion has a density of 0.983 grams/ml and showed only a 4.6 volume percent separation after 3 days at 72° F.

EXAMPLE IV

Preliminary tests were conducted on a road test section at Prudhoe Bay, Alaska. Two types of bituminous materials were tried. One material although having essentially the same characteristics as the emulsion composition of Example III was an emulsion made in plant scale equipment using the same method as in Example III. The finished emulsion contained 56.2 weight percent non-aqueous components. The bituminous component although composed principally of the above-mentioned Alaskan residuals was a blend of non-oxidized and oxidized bitumen. This was produced to give a bituminous component which had properties very similar to those of the product in Example I except it also was made on plant scale. The same method as employed in Example II was utilized to incorporate the polyol-isocyanate elastomeric polymer, i.e. the polyurethane, prior to emulsification again large scale to give a bituminous composition containing about 5 weight percent of polymer.

The gravel for the test installation was typical of that used in Arctic road construction in this area. By sieve analysis, 12.5 weight percent was retained on the 1 inch sieve, 45.6 weight percent was retained on the ⅜ inch sieve while 20.7 weight percent passed the No. 16 sieve (0.039 inch) and 3.2 weight percent passed the No. 200 mesh sieve (0.0029 inch). All analyses by United States standard sieves. Thus, there was a considerable amount of fines admixed with coarser particles. Prior to the test, however, the test strip had been coated with drilling muds so that the amount of fines was very much higher than for the original gravel.

The test installation was divided into three 300 foot sections, 30 feet wide, i.e. approximately 1000 square yards each. Thermocouples were installed under the roadway in order to determine the insulation properties.

In the first section, a road grader equipped with a scarifier tilled the road before each pass with hand-held spray equipment in order to expose the gravel and produce an even treat down to a depth of 6 inches. About 1.5 gallons/sq. yd. of the above-described bituminous emulsion was employed. The grader then used a plow attachment to distribute the consolidated gravel evenly across the road and a compactor vehicle compressed the surface. The road was then ready for use. In the middle section (the middle 300 feet) no coating was applied and this functioned as a control. In the third section, Alaskan 70 percent residuals only were applied using the same technique as for the first section with the temperature of the residuals being between 100° F. to 150° F. when applied.

It was found that under traffic conditions, no dusting occurred on the sections which has been treated whereas with the untreated section the usual large amount of dusting was observed.

Samples were taken from random portions of each of the treated road sections three weeks after installation and the treated sections were first subjected to sieve analysis. Thereafter the bituminous material was removed by extraction with benzene in a Soxhlet extraction apparatus, the extracted specimens were dried and subjected to sieve analysis. A comparison of the sieve analyses of the treated samples with the sieve analyses of the extracted samples showed that in every instance there was consolidation of both the coarse and fine particles since the percentage of material after extraction which passed through corresponding seives was considerably greater than that which passed through the same seive when treated. This was particularly true of the finer fractions.

It was also found that the aggregate which had been treated with the bituminous composition containing the elastomeric polymer gave better consolidation of the fines and also considerably better consolidation of the coarse particles.

It was determined from the temperature profile as determined by the thermocouples under the various test sections that the treated sections had no adverse effects whatsoever with respect to the insulation properties of the road.

From these and other runs it has been found that the amount of oxidation of the residuals can be varied by the time and temperature of oxidation, as has been described, and that such amount is critical only to the extent that hydroxyl groups are produced in the residuals for chemically combining the urethane polymer in the residuals. Thus, the residuals may be oxidized such that they have a very low Brookfield viscosity of 100 cps at 200° F. to a relatively high Brookfield viscosity of 2000 cps at 200° F. These oxidized residuals can still be handled readily for incorporation of the urethane polymer and by adjusting the amount and molecular weight of the polymer, as has been described, any desired final viscosity can be obtained commensurate with the objectives of this invention, i.e. providing a bituminous composition having excellent low temperature characteristics, i.e. ductility and viscosity at extremely low temperatures thereby preventing the composition from cracking or spalling from the aggregate.

EXAMPLE V

A sample of the Alaskan roadway aggregate described hereinbefore was dried and a series of polymerization-in-place runs was made wherein the Poly Bd R-45HT and toluene diisocyanate plus catalyst components were mixed at room temperature in the unoxidized 70 percent Alaskan crude residuals also described hereinbefore. The resulting blends were heated to 100° F. and the product was poured on to the aggregate. The weight percent of the Poly Bd R-45HT in the residuals was varied from about 52 down to 7 with corresponding amounts of diisocyanate. The penetration and cure were noted after 2 and 24 hours. The composition with the highest level of Poly Bd failed to penetrate the aggregate (less than 1/8 inch) and after 24 hours this composition had cured to a rubber-like material. The composition with the lowest amount of Poly Bd penetrated about ¼ inch, but after 24 hours it remained tackey and wet to the touch. Moreover, the residuals appeared not to be firmly bound and appeared to be water strippable. In order to possibly overcome this another series of runs were carried out utilizing excess toluene diisocyanate and these appeared to be beneficial in reducing tackiness but the penetration was still poor. When soaked under water these compositions did not strip but softened drastically.

EXAMPLE VI

Another series of runs were carried out wherein the Poly Bd R-45HT-toluene diisocyanate polymers were formed in situ in the unoxidized 70 percent Alaskan residuals prior to applica- to the aggregate. Even with dry aggregate the coating fail to penetrate the aggregate.

The foregoing Examples demonstrated that in order to obtain satisfactory consoldiation of aggregates and stabilization of roadway surfaces under conditions such as found in the Arctic and sub-Arctic regions, i.e. cold and wet conditions, it is necessary to employ the emulsion technique of this invention with the elastomeric polymer formed in situ and combined with the bituminous component which necessitates the use of an oxidized bituminous component.

EXAMPLE VII

The test road described in Example IV was subjected to a winter season's use during which the test road was subjected to temperatures of −50° F. and below for considerable periods of time. The roadway was then examined after the spring thaw and it was found that the section which had been treated with the bituminous component containing the polyurethane elastomeric polymer showed little or no cracking or spalling of the bituminous composition, whereas the section treated with the residuals alone showed a marked cracking and spalling effect. The difference was sufficient as to be observable visually. This clearly demonstrated the necessity of providing an oxidized bituminous composition containing a polyurethane elastomeric polymer applied as an aqueous emulsion in accordance with this invention in order to provide the necessary excellent low temperature properties to the stabilizing composition and provide the desired roadway surface stabilization.

We claim:

1. An aqueous emulsion which cures to a composition having excellent low temperature flexibility and ductility for the stabilization of the surface aggregate particles of roadways located in Arctic and sub-Arctic regions and subjected to extremely low winter temperatures which composition is not deleterious to the thermal insulation properties of said roadway and which inhibits the transfer of said aggregate particles to surfaces adjacent said roadway with consequent damage to said surfaces which comprises a bituminous composition comprising an air oxidized crude oil residuum having an initial boiling point above about 234°F. at one atmosphere and about 3 to 20 parts of a polyurethane per 100 parts of crude oil residuum produced in situ in said bituminous composition from a polyol having a substantially hydrocarbon backbone structure and which is soluble in said crude oil residuum and an aliphatic, aromatic or alicyclic diisocyanate in the presence of a sufficient amount of catalyst to effect formation of urethane polymer, the ratio of polyol hydroxyl groups to total isocyanate groups being greater than 1, said polyurethane being chemically bound to said air oxidized residuum.

2. The aqueous emulsion according to claim 1, wherein said hydroxyl-terminated polymer has a number average molecular weight of about 3000 with an average of from 2.2 to 2.5 hydroxyl groups per mole.

3. The aqueous emulsion according to claim 2, wherein the ratio of hydroxyl groups in said hydroxyl-terminated polymer to isocyanate groups in said polyisocyanate is in the range of from 1.1:1 to 5:1.

4. The aqueous emulsion according to claim 1, wherein said air oxidized crude oil residuum consists of the 70 percent by volume bottoms fraction of said crude.

5. The aqueous emulsion according to claim 1, wherein the amount of said bituminous composition containing said polyurethane ranges from 35 to 65 weight percent and the water ranges from 65 to 35 weight percent based on the total of 100 weight percent of emulsion.

6. The method for the production of the aqueous emulsion of claim 1, which comprises admixing said air oxidized crude oil residuum containing hydroxyl groups with an hydroxyl-terminated hydrocarbon polymer which is soluble therein and compatible therewith and a sufficient amount of catalyst suitable for the production of urethane polymer at a temperature sufficiently high to effect efficient mixing but below the polymerization temperature of the hydroxyl-terminated hydrocarbon polymer, thereafter admixing at an elevated temperature said oxidized residuumpolymer mixture with an aliphatic, aromatic or alicyclic diisocyanate to produce an elastomeric urethane polymer in said oxidized residuum and chemially bound thereto, and hydroxyl-terminated hydrocarbon polymer and diisocyanate being present in an amount sufficient to produce about 3 to 20 parts of polyurethane per 100 parts of crude oil residuum and thereafter forming an aqueous emulsion of the residuum-polymer composition at an elevated temperature in the presence of a sufficient amount of an anionic or cationic emulsifier to produce a stable emulsion.

7. The method according to claim 6, wherein said hydroxyl-terminated polymer has a number average molecular weight of about 3000 with an average of from 2.2 to 2.5 hydroxyl groups per mole and is admixed in said oxidized residuum component at a temperature in the range of from 140° F. to 160° F. for from ½ to 4 hours.

8. The method according to claim 6, wherein said diisocyanate is admixed with said oxidized residuumpolymer mixture at a temperature in the range of from 250°F. to 300°F. for from ½ to 4 hours.

9. The method according to claim 8, wherein said catalyst is dibutyltin dilaurate.

10. The method according to claim 8, wherein said catalyst is stannous octoate.

11. The method for the production of the aqueous emulsion of claim 1, which comprises heating said bituminous composition to a temperature of from 225°F. to 275°F., heating a water solution of a cationic emulsifier and hydrochloric acid to a temperature of 155°F. to 170°F. and passing said heated bituminous component and water solution through a colloid mill.

12. The method according to claim 11, wherein the amount of said bituminous component ranges from 35 to 65 weight percent and the water ranges from 65 to 35 weight percent based on the total weight of the mixture.

13. The method according to claim 11, wherein said bituminous component contains a crude oil residuum consisting of the 70 percent by volume bottoms fraction of said crude which has been air oxidized sufficiently to give an oxidized residuum having a Brookfield viscosity of from 100 centipoise to 2000 centipoise at 200°F.

14. The method for the stabilization of the surface aggregate particles of roadways located in the Arctic and sub-Arctic regions whereby said aggregate particles are inhibited from being transferred to surfaces adjacent said roadway with consequent damage to said surfaces which comprises admixing the surface aggregate particles of said roadway with the aqueous emulsion of claim 1.

15. The method according to claim 14, wherein said emulsion is produced by heating said bituminous composition to a temperature of from 225°F. to 275°F., heating a water solution of a cationic emulsifier and hydrochloric acid to a temperature of 155°F. to 170°F. and passing said heated bituminous component and water solution through a colloid mill.

16. The roadway having its surface aggregate particles stabilized by the composition of claim 1.

* * * * *

UNITED STATES PATENT OFFICE
CERTIFICATE OF CORRECTION

PATENT NO. : 3,909,474
DATED : September 30, 1975
INVENTOR(S) : Alfred E. Borchert et al.

It is certified that error appears in the above-identified patent and that said Letters Patent are hereby corrected as shown below:

Claim 6, line 17 the word "and" (first occurrence)

should read ...said....

Signed and Sealed this sixth Day of January 1976

[SEAL]

Attest:

RUTH C. MASON
*Attesting Officer*

C. MARSHALL DANN
*Commissioner of Patents and Trademarks*